United States Patent [19]

Barecki

[11] 4,099,772

[45] Jul. 11, 1978

[54] SEAT RACK WITH A REPLACEABLE HEAD REST COVER

[75] Inventor: Chester J. Barecki, Grand Rapids, Mich.

[73] Assignee: American Seating Company, Grand Rapids, Mich.

[21] Appl. No.: 749,727

[22] Filed: Dec. 13, 1976

[51] Int. Cl.² .............................................. A47C 31/10
[52] U.S. Cl. ............................... 297/220; 24/265 AL
[58] Field of Search ............. 297/220, 221, 223, 226, 297/283, 441; 160/403, 387; 5/353.1; 24/201 L, 265 AL

[56] References Cited

U.S. PATENT DOCUMENTS

| 659,662 | 10/1900 | Goudreau | 160/403 X |
|---|---|---|---|
| 1,051,566 | 1/1913 | Dreher | 297/223 X |
| 1,295,662 | 2/1919 | Witham | 297/226 |
| 1,353,930 | 9/1920 | Merkel et al. | 24/265 AL |
| 2,120,036 | 6/1938 | Northup | 297/226 X |
| 2,497,698 | 2/1950 | Struble et al. | 297/220 |
| 2,536,592 | 1/1951 | Caesar et al. | 297/221 |
| 2,637,373 | 5/1953 | Willetts | 297/226 |
| 2,842,189 | 7/1958 | Gratt | 297/223 X |

Primary Examiner—Francis K. Zugel
Attorney, Agent, or Firm—Price, Heneveld, Huizenga & Cooper

[57] ABSTRACT

A seat back is provided with a replaceable headrest cover including an elongated retainer securable to the seat back adjacent the top transverse edge of the headrest portion, a sheet material cover, and a clasp insertable through the retainer and through the cover for positively yet removably securing the sheet material cover to the headrest.

6 Claims, 10 Drawing Figures

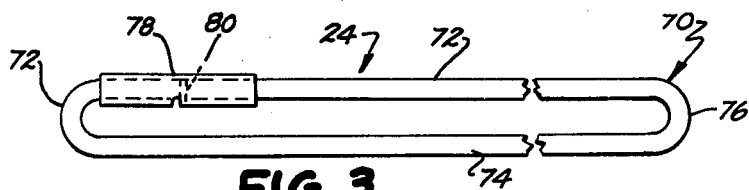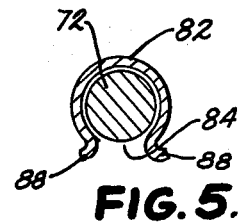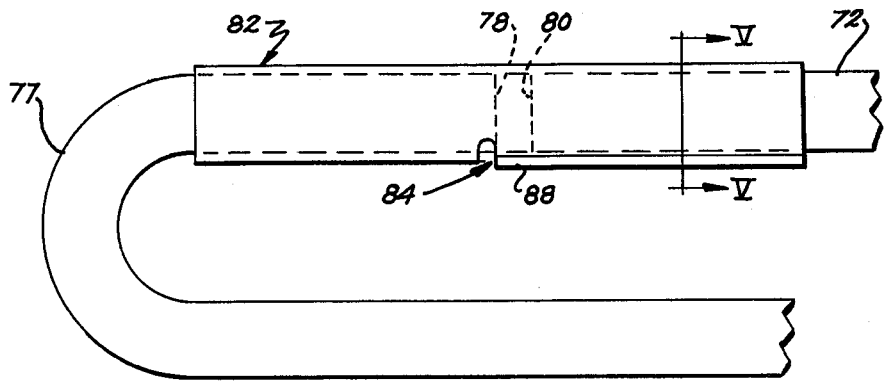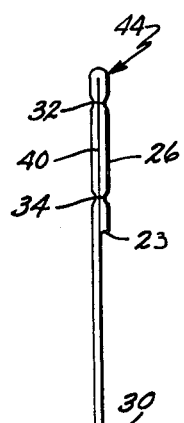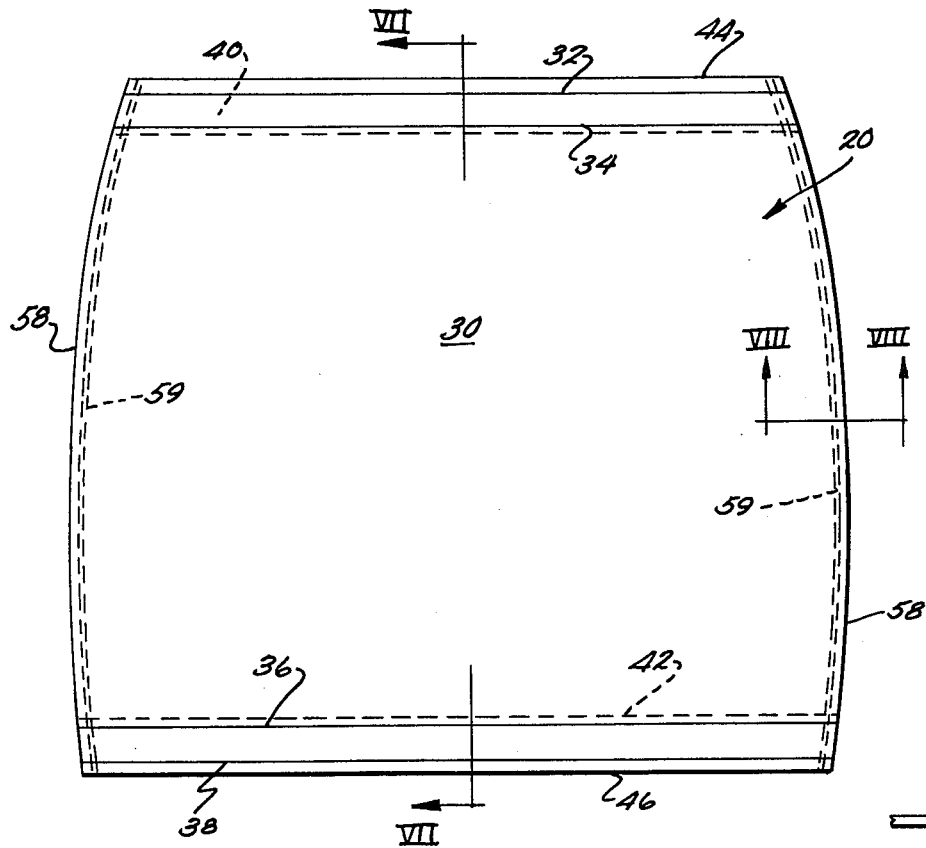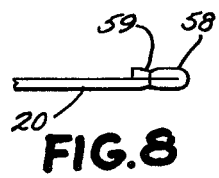

SEAT RACK WITH A REPLACEABLE HEAD REST COVER

BACKGROUND OF THE INVENTION

This invention relates to replaceable protective coverings for seats, more particularly, to a replaceable covering serving to prevent soiling of the headrest portion of a transportation seat and which may be removed, cleaned and replaced on the seat or removed and disposed of with a new cover placed on the seat.

In a typical transportation seat provided with a covered and padded headrest, problems are encountered in maintaining the permanent headrest covering material in a clean condition. This problem is especially acute in transportation seats provided for intercity or intrastate vehicles, such as buses, trains and airplanes. Since the transit times are typically longer with these vehicles, the passengers will recline the back portions of the seats resting their heads against the headrest material to assume a more relaxed position. This constant contact with the headrest will result in it quickly becoming soiled presenting an unsanitary or unclean appearance unless provision is made for preventing such soiling.

Heretofore, various proposals have been made for preventing the soiling of the existing padded headrest cover material. Typically, these proposals have taken the form of a replaceable cover which serves to protect the existing headrest covering material and which is removable and replaceable when it becomes soiled. An example of one such replaceable cover is the employment of a paper-like sheet material which is attached to the headrest portion by means of a Velcro type fastener. These forms of replaceable headrest covers although being easily replaceable tend to disengage from the Velcro strips under heavy usage. Movement of the passenger's head disengages the cover from the attachment strip. The loosening of the protective cover from the fastener results in soiling of the existing, permanent cover material. Also, replaceable covers have been attached to the headrest by means of snap fasteners. Although securing the cover to the headrest in a much more permanent or positive manner than the Velcro type fastening arrangement, problems have also been presented by these proposals. For example, the nap fasteners are relatively expensive to a manufacturer and to install. Further, due to the multiple connections which must be made when a plurality of snap fasteners are employed, the replacement or installation of the disposable covers is difficult. The snap fasteners on the cover also detract from the appearance of the seat.

A need, therefore, exists for an improved replaceable headrest cover assembly which is relatively easy and inexpensive to manufacture and positively secures the replaceable cover over the existing headrest material so that it may not be inadvertently removed or separated in use. Such an improved replaceable headrest cover assembly should also include the advantages of ease of attachment and removal as well as providing a pleasing appearance which would not detract from the aesthetic value of the existing seat back design.

SUMMARY OF THE INVENTION

In accordance with the present invention, an improved replaceable headrest cover for the seat back of a transportation seat and the like is provided whereby the problems heretofore experienced are substantially eliminated. Essentially, the replaceable cover for protecting a headrest includes a retainer permanently securable to a headrest adjacent the top transverse edge thereof, a sheet material cover including a cover passage adjacent the upper transverse edge thereof and a clasp means insertable through the retainer passage and the cover passage for securing the sheet material cover to the headrest in a positive yet removable manner.

In narrower aspects of the invention, a second retainer is secured to the headrest adjacent the lower transverse edge thereof and a second clasp means is insertable through the second retainer passage and through a second cover passage. Further, provision is made for concealing the retainers and the clasp means so that the replaceable cover assembly does not detract from the appearance of the transportations seat.

BRIEF DESCRIPTION OF THE DRAWINGS

FIG. 3 is a fragmentary, plan view of the clasp means employed to positively attach the headrest cover to the transportation seat;

FIG. 4 is an enlarged, fragmentary view of the clasp of FIG. 3 illustrating the manner by which the free ends of the clasp are connected;

FIG. 5 is a cross-sectional view taken generally along line V—V of FIG. 4;

FIG. 6 is a plan view of the replaceable cover in accordance with the present invention;

FIG. 7 is a cross-sectional view taken generally along line VII—VII of FIG. 6; and FIG. 8 is a fragmentary cross-sectional view taken generally along line VIII—VIII of FIG. 6.

DETAILED DESCRIPTION OF THE PREFERRED EMBODIMENT

Figure 1:
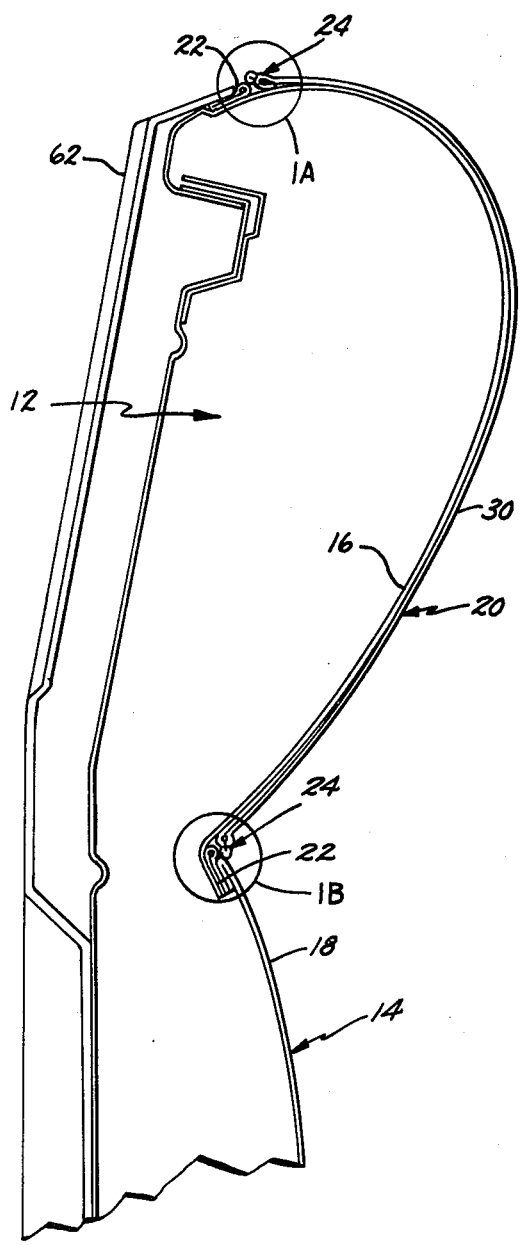
FIG. 1 is a fragmentary, side elevational view of a set including the replaceable headrest cover in accordance with the present invention.
Figure 2:
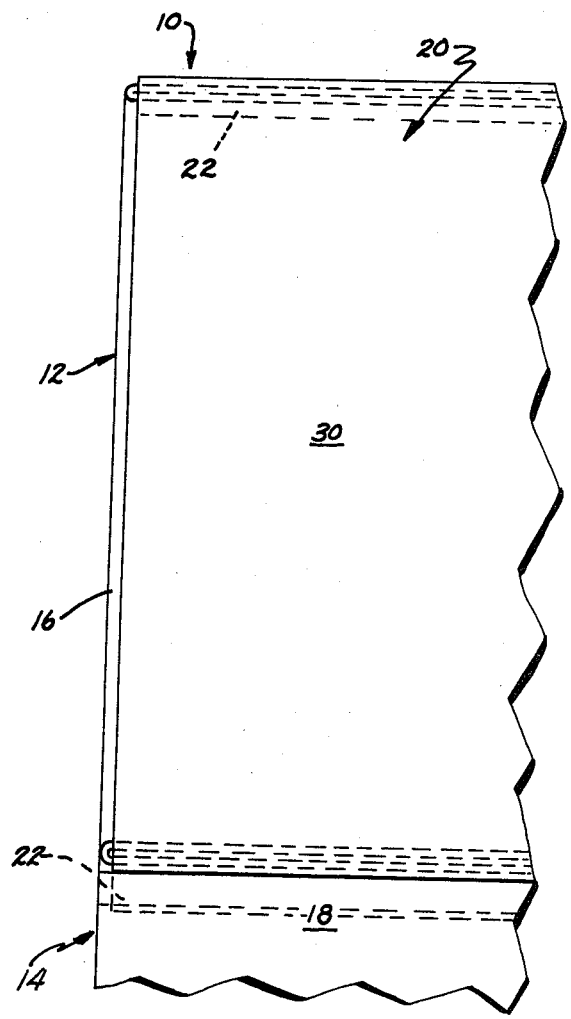
FIG. 2 is a fragmentary, front elevational view of the transportation seat incorporating the headrest of the present invention.

The preferred embodiment of the replaceable headrest cover assembly for a transportation seat and the like in accordance with the present invention is illustrated in the drawings and generally designated 10. FIGS. 1 and 2 partially illustrate a transportation seat including a back portion having a padded and covered headrest 12 and a lower back support 14. The padded headrest 12 is permanently covered by an existing covering material 16. The lower back portion 14 is permanently covered by existing material 18. The replaceable headrest cover assembly 10 includes a sheet material cover 20, upper and lower retainers 22 permanently secured to the seat back and a pair of identical clasp means 24 for positively attaching the sheet material cover 20 to the headrest 12.

As best seen in FIGS. 6, 7 and 8, the sheet material cover 20 is preferably formed from a single piece of material such as a vinyl plastic. The transverse upper and lower edges 23, 25, respectively, of the cover material are folded or reverse bent on the material. The reverse folded portions 26, 28 are joined to the main portion 30 of the cover along spaced, parallel lines 32, 34 and 36, 38, respectively. This reverse folding or looping of the transverse edges of the sheet material cover and subsequent securement defines open-ended, cover passages 40, 42 for receipt of a portion of the clasp means as more fully explained below. The cover passages border the main portion 30.

The joining of the reverse folded portion 26 of the cover along the line 32 forms a concealment flap 44 extending along the upper peripheral edge of the cover. Similarly, the joining of the reverse folded portion 28 to the material along the line 38 forms a concealment flap 46 extending along the peripheral transverse edge of the lower end of the cover. The concealment flaps, as more fully described below, cover the retainers 22 and the clasp means 24. Finally, the cover 20 may be folded over and hemmed at its lateral edges 58 along a line 59. This is best seen in FIG. 8. As is apparent from FIG. 6, the cover 20 is preferably configured to conform to the headrest of the seat which typically will be tapered upwardly from the lower edge thereof. The cover may be formed from any suitable, preferably stain and dirt resistant, material, such as a vinyl plastic. The various forming or hemming operations may be accomplished by sewing or heat sealing depending on the material selected.

Figure 1A:
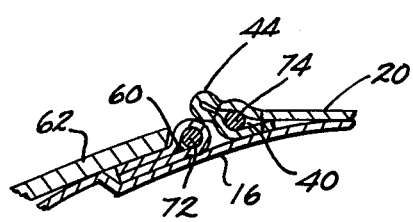
FIG. 1a is a fragmentary, greatly enlarged cross-sectional view illustrating the manner by which the replaceable cover in accordance with the present invention is secured to the transportation seat adjacent the top transverse edge of the headrest.
Figure 1B:
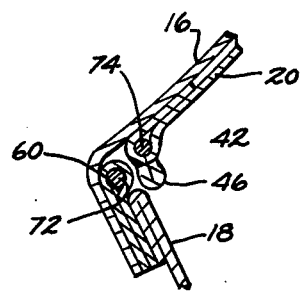
FIG. 1b is a greatly enlarged, fragmentary, section view illustrating the manner by which the replaceable cover is attached to the transportation seat.

As best seen in FIGS. 1a, 1b and 2, the retainers 22 are elongated strips of sheet-like material which are reverse folded about the longitudinal center line of the strip. The transverse edges of the strip are juxtaposed to thereby define a retainer passage 60. The looped or folded retainers 22 are then permanently secured to the headrest. The upper retainer, for example, may be glued or otherwise suitably secured between the existing headrest covering material 16 and a decorative back panel 62. In a similar manner the lower retainer 22 is permanently secured to the seat structure by attachment or sandwiching between the existing headrest covering material 16 and the existing lower back covering material 18. In the preferred form, the retainers are formed from a vinyl plastic material or the same material as the existing covers and may either be sewn or heat sealed to the headrest. As is apparent from FIGS. 1 and 2, the retainers extend longitudinally across the upper and lower transverse edges of the headrest portion of the seat back. They are spaced vertically and extend in a generally parallel relationship.

As previously stated, the cover 20 is removably yet positively and semi-permanently secured to the headrest by clasp means which connects the transverse edge portions of the cover to the retainers. The clasp means, illustrated in detail in FIGS. 3, 4 and 5, is formed from a single length of wire 70, reverse bent intermediate its ends to define a first elongated arm 72 and a second elongated arm 74, joined at their ends by a curved, hinge-like portion 76. The arm 72 is shorter than the arm 74 and extends in a spaced, parallel relationship to the arm 74. The free end portion of the arm 74 is reverse bent to define a hook-like portion 77. The end 78 of arm 74 terminates spaced from and coaxial with the end 80 of the first arm 72.

In the preferred construction, a clip 82 is provided for latching or connecting the free ends 78 and 80 of the arms together. The clip 82 is illustrated as being an elongated, cylindrical, member open at both ends. Intermediate the open ends of the clip is formed an entrance slot 84 which extends through one end of the cylindrical wall of the clip. The non-slotted cylindrical portion 88 of the clip is slipped onto the hook portion of the second arm 74 and is permanently secured thereto as by spot welding. As shown in FIG. 4, the entrance slot begins adjacent the free end 78 of the first arm 74 and is dimensioned so as to have a width less than the diameter of the first arm 72. When forming the slot 84, it is preferred that outwardly extending, curved flanges 88 be provided (FIG. 5). These flanges 88 guide the free end 80 of the first arm 72 as it is snapped into the clip. The clasp is preferably formed from a resilient, spring-like steel wire material so that the curved portion 76 acts as a hinge with respect to the arm 74 and the arm 72 is readily removable from and positionable into the clip 82.

In a presently preferred embodiment, the clasp is formed from 0.13 diameter 11 guage music wire rod. The clip 82 is formed from a 26 gauge 1060 steel which is heat treated to Rockwell C 40 to 45. The clip 82 has an overall length of approximately 1 inch with the slot having a length of approximately ½ inch. The clasp is formed so that the distance between the opposed faces of the first and second arms is approximately ¼ inch. The replaceable headrest cover is formed from sheet 38 ounce vinyl as are the retainers 22. The folded portions of the sheet material are positioned so that the distance from the lines 32 and 38 to the transverse edges of the cover is approximately ¼ inch. Further, the spacing between the lines 32, 34 and 36, 38 is approximately 11/16 inch. The transverse and longitudinal dimensions of the headrest cover will, of course, vary with the size of the headrest with which the cover assembly is employed. It is preferred, however, that the cover be dimensioned so as to protect substantially the entire surface of the headrest, as illustrated in FIGS. 1 and 2.

OPERATION

In use, the retainers 22 are permanently secured in a spaced, parallel relationship to the headrest of the seat back. The cover 20 is then placed over the headrest surface. The clasp 24 is then opened by removing the free end 80 of the first arm 72 from the clip. The arm 72 is then inserted through the retainer passage 60. Simultaneously, the hook portion of the second arm 74 is passed through the cover passage 40. Once pushed all the way through the material, the free end 80 is returned to the clip. In a similar manner, another clasp 24 is passed through the lower retainer 22 in the lower passage 42 of the cover. As best seen in FIGS. 1, 1a and 1b, the concealment flaps 44 and 46 cover the retainers 22. As a result, the replaceable cover assembly does not detract from the overall aesthetic appearance of the seat back.

Therefore, as should now be readily apparent the seat back headrest, replaceable cover assembly in accordance with the present invention is easily and relatively inexpensively manufactured of readily available material. The clasp attachment prevents inadvertent removal of the cover as has been a problem with some of the prior art proposals. Further, the clasp is substantially concealed by the cover so that the overall appearance of the seat back remains essentially unchanged. The cover material is easily installed on the seat and readily replaceable with a minimum of effort.

Various modifications will undoubtedly now become apparent to those of ordinary skill in the pertinent art. For example, a retainer passage need not be continuous and further only the upper retainer and clasp need be employed. Use of the lower clasp is preferred, however, since it results in the cover material being pulled over the existing cover and also insures that the cover will not be folded back or flipped over so as to leave the existing headrest cover material unprotected as can occur when only an upper attachment is employed.

Therefore, the above description should be considered as that of the preferred embodiment only. The true spirit and scope of the present invention will be determined by reference to the appended claims.

The embodiments of the invention in which an exclusive property or privilege is claimed are defined as follows:

1. A replaceable covering for protecting the headrest of a seat, said headrest having a headrest covering material extending from the front to the top transverse edge and providing a rest for the head of a passenger, said covering material being overlapped at the front and at the top transverse edge by front and back covering members, respectively, comprising:

a retainer permanently secured to said headrest adjacent the top transverse edge thereof, said retainer comprising an elongated strip of reverse folded material interposed and secured between the overlapping back member and the top transverse edge of the headrest covering material and defining a retainer through passage;

a sheet material protective cover having a main portion and an upper reverse folded edge defining a cover passage adjacent the upper transverse edge thereof bordering the main portion of said protective cover; and clasp means insertable in said retainer passage and said protective cover passage for releasably securing said sheet material cover to said headrest, said clasp means comprising:

a first elongated arm;

a second elongated arm joined to and integral with said first arm and extending parallel to and spaced from said first arm, one of said first and second arms being insertable in said retainer passage and the other arm being insertable in said protective cover passage; and clip means releasably securing one end of said first arm to one end of said second arm, said clip means being located in one of said passages and substantially concealed therein.

2. A replaceable headrest cover assembly as defined by claim 1 wherein said first elongated arm extends along its length in a parallel, spaced relationship with said second arm.

3. A headrest construction for a transit vehicle seat having a replaceable headrest cover, said headrest having a headrest covering material extending from the front to the top transverse edge and providing a rest for the head of a passenger, said covering material being overlapped at the front and at the top transverse edge by front and back covering members, respectively; a first elongated strip of reverse folded material interposed and secured between the overlapping portions of the front covering member and the headrest covering material and a second elongated strip of reverse folded material interposed and secured between the overlapping portions of the back covering member and the headrest covering material; said elongated strips of reverse folded material forming retainers secured to said headrest adjacent its top transverse edge and below the top edge at the front of the seat back, the reverse folded material defining retainer through passages; a protective material cover having a main portion and upper and lower reverse folded edges defining protective cover passages adjacent the upper and lower transverse edges thereof bordering the main portion of said cover; and clasp means insertable in said retainer passages and said protective cover passages for releasably securing said protective material cover to said headrest, each of said clasp means comprising: a first elongated arm; a second elongated arm joined to and integral with said arm and extending parallel to and spaced from said first arm, each one of said first and second arms being insertable in one of said retainer passages and each of said other arms being insertable in one of said protective cover passages; and clip means for each of said clasp means for releasably securing one end of said first arm to said one end of said second arm, said clip means being located in one of said passages and substantially concealed therein whereby said clasp and clip means concealingly secures said upper edge of said sheet material cover to the retainer at the top transverse edge of the headrest and the lower reverse folded edge of said protective material cover at a position below the top edge at the front of the seat to thereby cover the headrest by said protective material cover which is removable by means of said clasp and clip means.

4. The headrest construction of claim 1 in which the clasp comprises a length of wire formed into an elongated loop with its ends spaced but adjacent to, aligned with and facing each other with the clip means on one of said ends slidably movable over both of said ends, said clip means being movable into a position spaced from one of said ends for receiving the protective cover and retainer means therebetween for insertion of said clasp into said passages.

5. The headrest construction of claim 3 in which the clasp comprises a length of wire formed into an elongated loop with its ends spaced but adjacent to, aligned with and facing each other with the clip means on one of said ends slidably movable over both of said ends, said clip means being movable into a position spaced from one of said ends for receiving the protective cover and retainer means therebetween for insertion of said clasp into said passages.

6. A replaceable headrest cover assembly as defined by claim 3 wherein said first elongated arm extends along its length in a parallel, spaced relationship with said second arm.

* * * * *